United States Patent [19]
Fellows et al.

[11] Patent Number: 5,557,887
[45] Date of Patent: Sep. 24, 1996

[54] YIELDABLE GEARING AND SAFETY MECHANISMS FOR GARAGE DOOR OPERATORS

[75] Inventors: Jerry W. Fellows, 4950 John Muir Rd., Martinez, Calif. 94553; Thomas M. Sherlock, Los Altos Hills; Richard S. Davis, Palo Alto, both of Calif.

[73] Assignee: Jerry W. Fellows, Martinez, Calif.

[21] Appl. No.: 330,479

[22] Filed: Oct. 28, 1994

Related U.S. Application Data

[63] Continuation-in-part of Ser. No. 268,767, Jun. 29, 1994, abandoned.

[51] Int. Cl.$^6$ ................................................ E05F 15/20
[52] U.S. Cl. ........................ 49/28; 49/139; 49/199; 49/360; 160/188; 318/807; 340/515
[58] Field of Search ................................ 49/28, 26, 139, 49/140, 360, 199, 200; 318/807, 798, 727; 160/188, 189; 324/1 NQ; 340/514, 515

[56] References Cited

U.S. PATENT DOCUMENTS

| | | |
|---|---|---|
| 1,425,792 | 8/1922 | Pignani et al. . |
| 3,066,729 | 12/1962 | Gessell . |
| 3,336,968 | 8/1967 | Curtis . |
| 3,512,302 | 5/1970 | Sivin et al. . |
| 3,591,981 | 7/1971 | Law . |
| 3,825,809 | 7/1974 | Gatland et al. . |
| 4,018,005 | 4/1977 | Harris . |
| 4,055,023 | 10/1977 | Gatland et al. . |
| 4,159,598 | 7/1979 | Gatland et al. . |
| 4,191,237 | 3/1980 | Voege . |
| 4,281,475 | 8/1981 | Spadoni-Censi . |
| 4,342,354 | 8/1982 | Leivenzon et al. . |
| 4,428,252 | 1/1984 | Manini . |
| 4,472,910 | 9/1984 | Iha . |
| 4,504,094 | 3/1985 | Burrows . |
| 4,553,652 | 11/1985 | Fallos . |
| 4,605,108 | 8/1986 | Monot . |
| 4,653,565 | 3/1987 | Iha et al. . |
| 4,667,789 | 5/1987 | Cucchi et al . |
| 4,680,537 | 7/1987 | Miller ........................................ 324/500 |
| 4,706,727 | 11/1987 | Leivenzon et al. . |
| 4,732,203 | 3/1988 | Alten . |
| 4,794,314 | 12/1988 | Janu et al. . |
| 4,832,184 | 5/1989 | DeGood . |
| 4,923,047 | 5/1990 | Fink et al. . |
| 5,040,643 | 8/1991 | Chapman et al. . |
| 5,042,315 | 8/1991 | Fahy et al. . |
| 5,080,642 | 1/1992 | Takami . |
| 5,105,131 | 4/1992 | Schap ........................................ 318/282 |
| 5,222,327 | 6/1993 | Fellows et al. . |
| 5,239,252 | 8/1993 | Runggaldier et al. ................... 318/806 |
| 5,246,095 | 9/1993 | Barnhill, III et al. . |
| 5,278,480 | 1/1994 | Murray . |
| 5,334,876 | 8/1994 | Washeleski et al. .................... 307/10.1 |
| 5,335,307 | 8/1994 | Sommer .................................. 388/814 |
| 5,384,495 | 1/1995 | Waggamon et al. ..................... 307/326 |

*Primary Examiner*—Philip C. Kannan
*Attorney, Agent, or Firm*—Townsend & Townsend & Crew, LLP

[57] ABSTRACT

A garage door operator which senses obstructions and takes corrective action before entrapment can occur. Yieldable gears are utilized as a failsafe mechanism such that when the applied torque exceeds certain limit, the gears disengage so that the garage door can be manually moved. The yieldable gears may also be disengaged by remote control or by hand. Solid state circuitry is provided to achieve soft starts and stops of the electric motor. Test circuitry is provided that tests the operational readiness of the electrical components by simulating an abnormal torque condition. During operation of the electric motor, the torque load is electronically calculated and if an abnormal torque load is encountered, the electric motor reverses direction.

36 Claims, 10 Drawing Sheets

YIELDABLE GEARING AND SAFETY MECHANISMS FOR GARAGE DOOR OPERATORS

This application is a continuation-in-part of U.S. application Ser. No. 08/268,767 filed on Jun. 29, 1994 for YIELDABLE GEARING AND SAFETY MECHANISMS FOR GARAGE DOOR OPERATORS, now abandoned.

BACKGROUND OF THE INVENTION

The present invention is related to an apparatus for opening and closing doors and, more particularly, to a garage door operator with yieldable gearing and other safety mechanisms.

Garage door operators are used extensively throughout the United States of America with an estimated 20 million units in use today. Many control methods exist for reversing the drive mechanism when an obstruction is contacted during door closure. Three such methods are disclosed in U.S. Pat. No. 4,055,023 issued to G. H. Gatland et al.; U.S. Pat. No. 4,159,598 issued to G. H. Gatland et al.; and U.S. Pat. No. 4,191,237 issued to C. B. Voege. These garage door operators usually employ some mechanism for sensing obstructions through torque measurement, motor sensing, pressure switches, and the like.

Although these methods provide a degree of safety, should the sensing mechanism malfunction, the garage door operator may continue to apply force to an obstructed garage door. Thus, a clutch may be used as a torque limiter to add another degree of safety. Such a clutch mechanism is shown in U.S. Pat. No. 4,281,475 issued to V. Spandoni-Censi. However, while the clutch is slipping, force is still being applied to the obstructed garage door which can entrap a person in the closing door causing serious injury.

Present garage door operators also do not check the operational readiness of the obstruction sensing mechanism before applying force to the garage door. Thus, a detectable malfunction could result in entrapment.

SUMMARY OF THE INVENTION

The present invention provides a garage door operator with a transmission designed to help prevent entrapment. The transmission directs power from an electric motor to a mechanism for opening and closing the garage door. The transmission includes a set of yieldable gears which provide a failsafe safety mechanism that can be used in conjunction with conventional safety mechanisms. When the torsional force between the gears reaches a certain predetermined point, the gears disengage so that the electric motor is no longer forcing the garage door closed. Once the gears are disengaged, the garage door may be manually opened or raise automatically if biased to a negative weight. A lever and/or remote controlled electric solenoid can also be used to disengage the yieldable gears.

In one embodiment, the yieldable gears are two crown gears. When the torsional force reaches a certain point, the torsional force and the angle of the teeth of the crown gears urge the gears to separate. A detent is used to hold the crown gears in an engaged or disengaged position. Although this embodiment is complex, it provides a high degree of durability.

In another embodiment, the yieldable gears are two conventional spur gears. A first gear is driven by the electric motor and engages a second gear. The second gear is located on a shaft which is supported by a rotatable yoke. When the torsional force reaches a certain point, the torsional force causes the yoke to rotate so that the first and second gears disengage. A detent is used to hold the gears in an engaged or disengaged position.

In yet another embodiment, an existing actuator (includes the electric motor and transmission) for use in a garage door operator is modified to incorporate the present invention. A shaft within the transmission is replaced with a shaft incorporating two crown yieldable gears described above. Thus, an existing garage door actuator may be modified to include a set of yieldable gears to help prevent entrapment.

The present invention also provides actuator circuitry to control the amount of power applied to the alternating current (AC) electric motor to achieve soft starts and stops. The control circuitry may be used in conventional garage door operators to achieve improved motor control. A microcontroller causes trigger pulses to activate triacs a time delay after the AC line crosses zero, lowering the applied voltage. As time progresses, the trigger pulses are sent closer to the zero crossing, causing a fuller AC wave and gradually more applied power thereby achieving a soft start of the motor. A soft stop is achieved by reverse application.

The present invention further provides test circuitry for testing the operational readiness of the actuator's electrical components that electrically detect a torque overload condition. The test circuitry may be used to test a conventional control circuit. The test is performed before power is applied to the electric motor. The test circuitry includes a resistor that represents the resistance of the electric motor at an abnormal load situation. Power representing an abnormal load torque is then applied to the resistor and the current through the resistor is sensed by a sensing element. A microcontroller is then required to register a "failure" within a predetermined time period because of the abnormal current drain. If a "failure" is not registered, indicating the circuitry may not detect a possible entrapment, the actuator circuitry will not operate. The actuator circuitry also monitors the current drain of the motor during operation to detect a torque overload condition, indicating the garage door hit an obstruction, and automatically reverses direction of movement of the garage door.

A further understanding of the nature and advantages of the present invention may be realized by reference to the remaining portions of the specification and the drawings.

DESCRIPTION OF THE PREFERRED EMBODIMENT

The present invention is described as being utilized in a garage door operator that includes a side mounted garage door actuator. However, the present invention may be readily practiced in other garage door operator implementations (e.g, center mounted actuator). Thus, the present invention is not limited to a specific garage door operator implementation.

Figure 1:
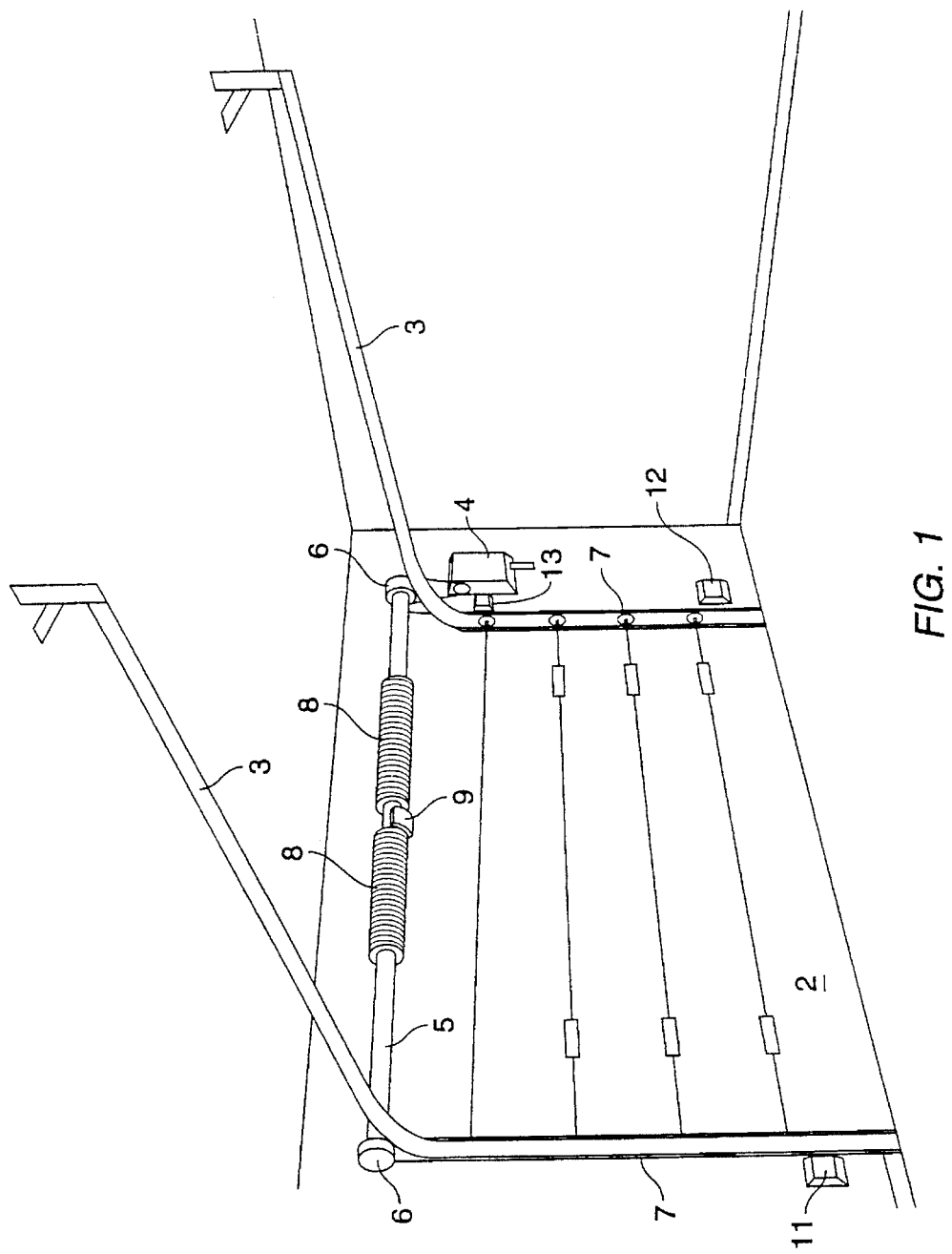
FIG. 1 is a perspective view of an implementation of a garage door operator according to the present invention.

FIG. 1 shows a perspective view of an implementation of a garage door operator according to the present invention. A garage door 2 raises and lowers along rails 3. An actuator 4 is mounted next to the side of the garage door to open and close the garage door by rotatably driving a shaft 5. The shaft has a pair of cable drums 6 on each end of the shaft. As the cable drums rotate, they either wind up or let out a pair of cables 7 which are attached to the bottom of the garage door, thereby opening or closing the garage door.

A pair of coil springs 8 bias the weight of the garage door. One end of each coil is attached to a center support bracket 9. The center support bracket is attached to a garage wall to support the center of shaft 5. The other end of each coil, the end opposite the center support bracket, is attached to shaft 5. When the garage door is open or in an up position, coil springs 8 are only slightly coiled. As the garage door lowers, the coil springs become more tightly coiled, increasing the upward bias on the garage door. Preferably, the garage door is biased to a neutral weight at all positions.

If the garage door hits an obstruction while closing, the effective weight of the garage door decreases so the coil springs act to rotate shaft 5 against actuator 4. The actuator senses the increased resistance and reverses direction, thereby opening the garage door. In the event the actuator cannot or does not reverse direction upon hitting an obstruction, the present invention provides failsafe yieldable gears that disengage the transmission in the actuator.

As the garage door is closing, a light source 11 shines a beam to an electric eye 12. If the electric eye detects that there is an obstruction (e.g., a child), the actuator reverses direction so the garage door does not close on the obstruction. The present invention attempts to close the door again at a later time so that the garage door does not remain open, thereby increasing the security of the house. The present invention also provides a solenoid 13 that places a pin in rail 3 when the garage door is closed so that the garage door is securely locked shut.

Figure 2:
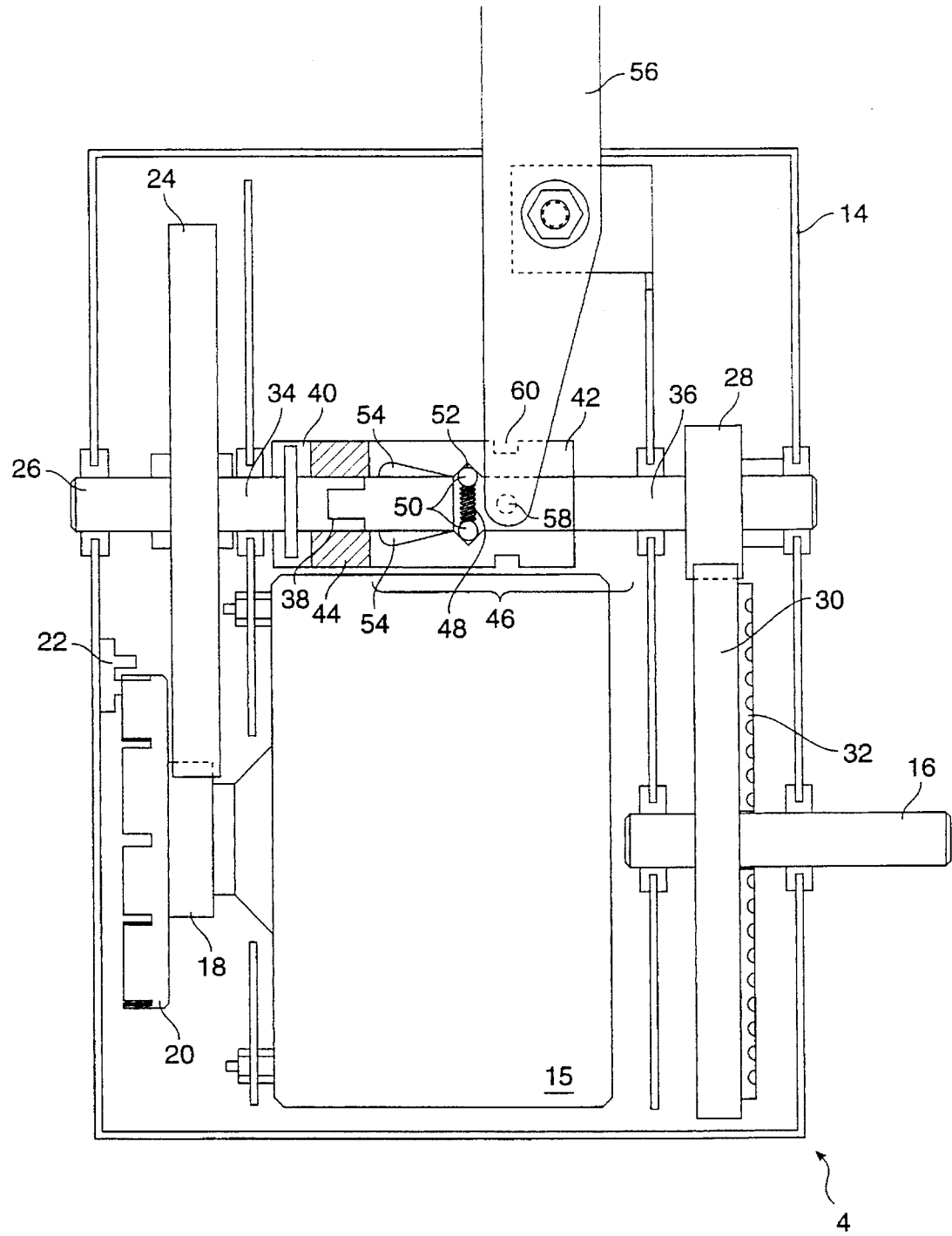
FIG. 2 is a top view of an embodiment of an actuator of a garage door operator according to the present invention.

An embodiment of an actuator for use in a garage door operator according to the present invention is shown in FIG. 2. Actuator 4 is contained in a casing 14. Within the casing is a reversible AC electric motor 15 that transmits a rotational force through a transmission including a set of reducing gears to an actuator drive shaft 16. The actuator drive shaft is connected to the mechanism for opening and closing the garage door.

The shaft of electric motor 15 is connected to a first gear 18. The first gear is shown with an encoder 20. The encoder has a number of slits which may be detected by an optical sensor 22. The frequency of which the slits are detected by the optical sensor may be used to determine the rotational speed (revolutions per minute) of the electric motor.

First gear 18 engages a larger second gear 24. The second gear is located on an end of an intermediate shaft 26. As the second gear is larger than the first gear, the rotational speed of the intermediate shaft is slower and torque is increased compared to the electric motor. This reduction is generally necessary to bring the actuator output to levels usable in a garage door operator.

A third gear 28 is located on an end of intermediate shaft 26. The third gear reducingly engages a larger fourth gear 30 that is on actuator drive shaft 16. The fourth gear is shown having a spiral track 32 on the side of the gear which may be utilized by a system to operate limit switches for halting the movement of the garage door at its full up and down positions. Such a system is disclosed in U.S. Pat. No. 5,222,327, issued Jun. 29, 1993 to Fellows et al., which is hereby incorporated by reference for all purposes.

The intermediate shaft is composed of a proximal shaft 34 and a distal shaft 36. The proximal shaft is driven by second gear 24 and the distal shaft drives third gear 28. The two shafts are connected between the second and third gears at a support junction 38. At the support junction, the proximal shaft has a rounded hole which receives a rounded protrusion from the distal shaft. In this manner, the two shafts are connected for support but are free to rotate independently.

A crown gear 40 is located on the proximal shaft near the support junction. As with the other gears so far described, the proximal crown gear is coupled to the proximal shaft so that the gear and shaft rotate together. A crown gear 42 is located on the distal shaft near the support junction. Distal crown gear 42 engages proximal crown gear at a crown gear teeth engagement area 44.

The distal shaft along an area 46 has a square cross-section. The inner surface of the distal crown gear also has a square cross-section (except for the inner surface of the gear's teeth). The square surfaces engage so that the distal crown gear rotates with the distal shaft. The distal crown gear may also slide towards the third gear so that the teeth of the proximal and distal crown gears are no longer engaged. When the gears are disengaged, electric motor 14 no longer drives the distal shaft and the distal shaft is free to rotate.

The crown gears are preferably formed with gear teeth set at approximately 20°–30° angles. As the torque required to rotate the distal crown gear increases past a certain level (e.g., when the garage door has hit an obstruction), the torsional force moves the distal crown gear toward the third gear, disengaging the yieldable crown gears.

A spring 48 is shown located within a hole through the distal shaft. The spring applies pressure to a pair of ball detents 50 seated in a pair of grooves 52 on the inner surface of the distal crown gear. As the torsional force increases, spring 48 is compressed allowing the ball detents to come out of grooves 52 which permits the distal crown gear to travel towards the third gear. As the distal crown gear travels toward the third gear, the ball detents follow a pair of increasingly deep grooved channels 54 on the inner surface of the distal crown gear. Because the grooved channels are deeper at the proximal end, the distal crown gear is restrained, disengaged near the third gear.

A lever 56 is connected to distal crown gear 42 by a circular protrusion 58 which has an end which seats in a groove 60 on the outside surface of the distal crown gear. Lever 56 may be rotated manually to disengage the crown gears. A remote controlled solenoid also rotates the lever to disengage the gears. Once the crown gears are disengaged, lever 56 may be rotated manually to reengage the crown gears.

The torsional force required to disengage the crown gears would be mainly a function of the angle of the crown gear teeth and the spring compression rating. An external spring could be added to the arrangement to urge the distal crown gear towards the second gear. The compression rating of this external spring can be selected to set the desired operational torque where the yieldable gears will disengage. Preferably, the garage door is biased to a neutral weight so that it will remain stationary when the yieldable gears are disengaged.

Figure 3:
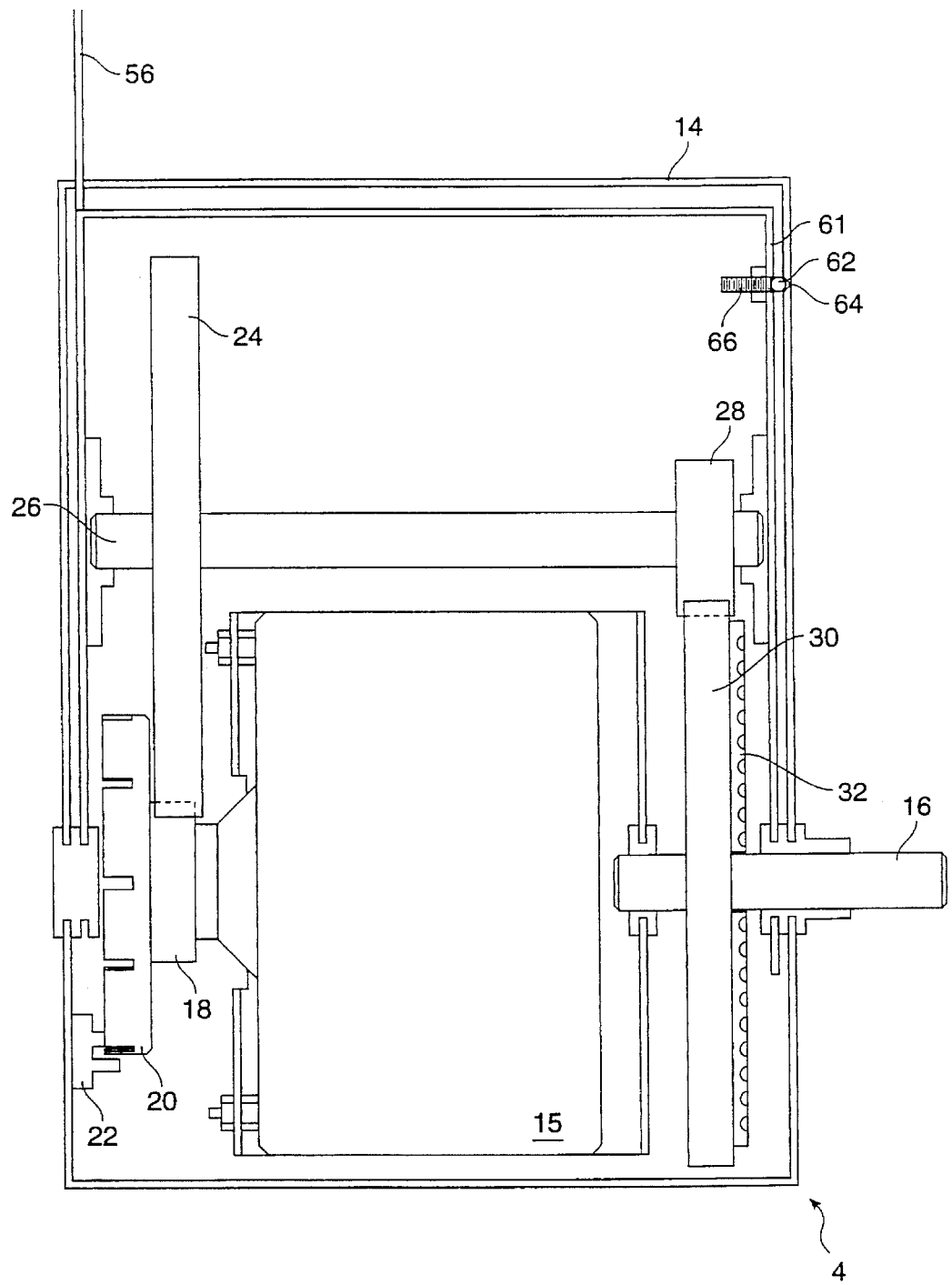
FIG. 3 is a top view of an embodiment of an actuator of a garage door operator according to the present invention.

Another embodiment of an actuator for use in a garage door operator according to the present invention is shown in FIG. 3. Elements that are common with the embodiment in FIG. 2 are shown with the same reference numerals.

Within casing 14 is a yoke 61 which supports intermediate shaft 26 which has second gear 24 and third gear 28 located thereon. The yoke rotates about the axis of rotation of the actuator drive shaft 16. The yieldable gears of this embodiment are third gear 28 and fourth gear 30. When the torsional force between the third and fourth gears reaches a certain level, the yoke rotates away from the first gear until the first and second gears become disengaged. However, the third and fourth gears do not become disengaged.

The first and second gears remain engaged by a ball detent 62. Ball detent 62 is biased toward an indentation 64 in the casing by a spring 66. Once the torsional force overcomes the retaining force of the ball detent, the yoke will rotate and the yieldable gears will become disengaged. Lever 56 is connected to yoke 61 and is used to lower the yoke to reengage the first and second gears. The lever may be rotated manually to disengage or reengage the gears.

Figure 4A:
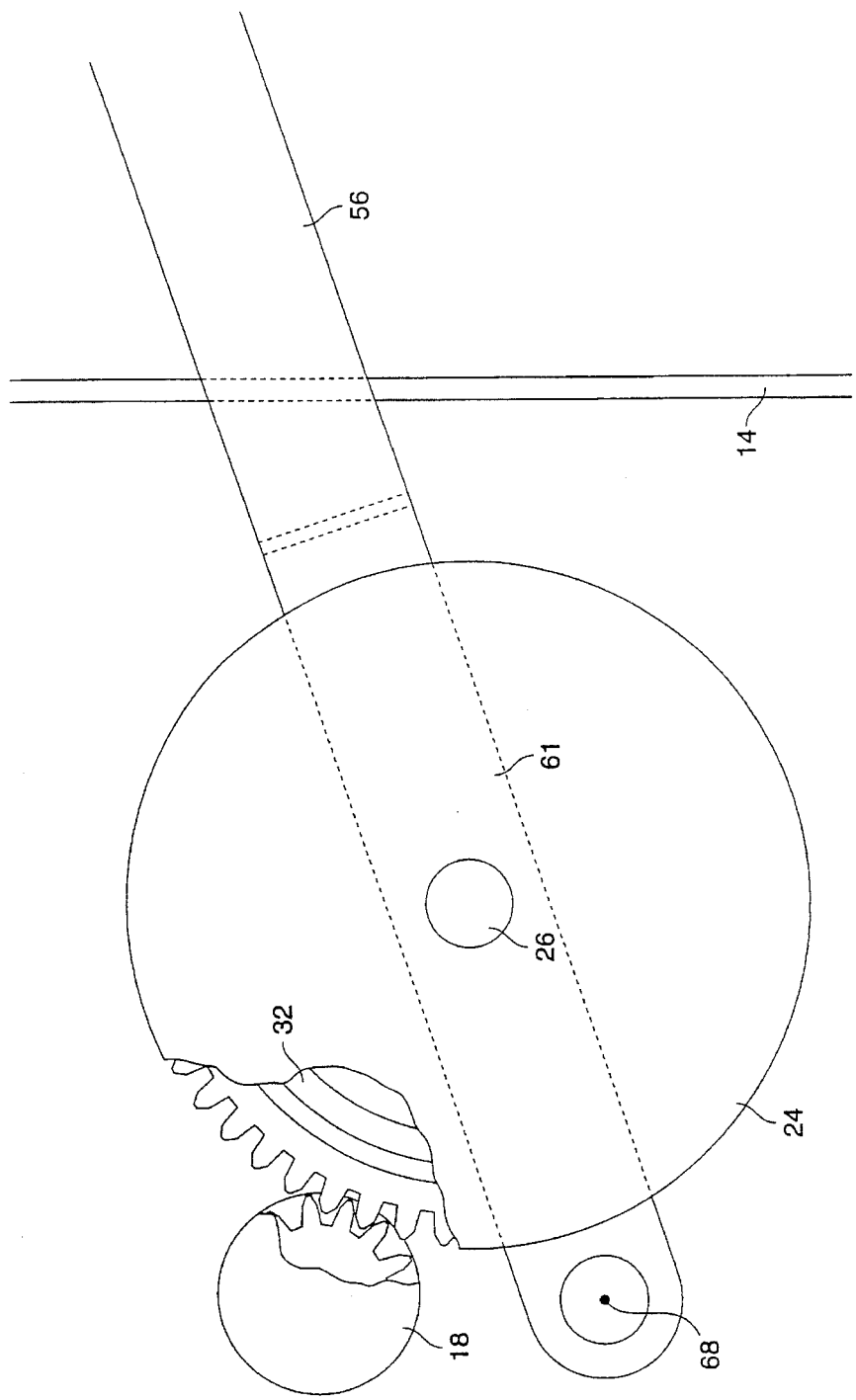
FIG. 4A is a side view of the yieldable gears in an engaged state in the embodiment of FIG. 2.

FIG. 4A shows a side view of the embodiment of FIG. 3 with the first and second gears engaged. When the first and second gears are engaged, the rotational force is transmitted from the first gear to the second gear which causes intermediate shaft 26 to rotate.

First gear 18 is located higher than an axis 68 upon which yoke 61 rotates. Lever 56 is shown connected to one end of the yoke. Axis 68 is shown as a dot because it is perpendicular to the plane of the first and second gears. Fourth gear 30 (not shown in FIG. 4A) also rotates about axis 68. Because the yoke and fourth gear rotate about the same axis, the third and fourth gears are continually engaged when the yoke rotates. Although the first gear is shown at a position higher than axis 68, it could also be placed lower than the axis.

Figure 4B:
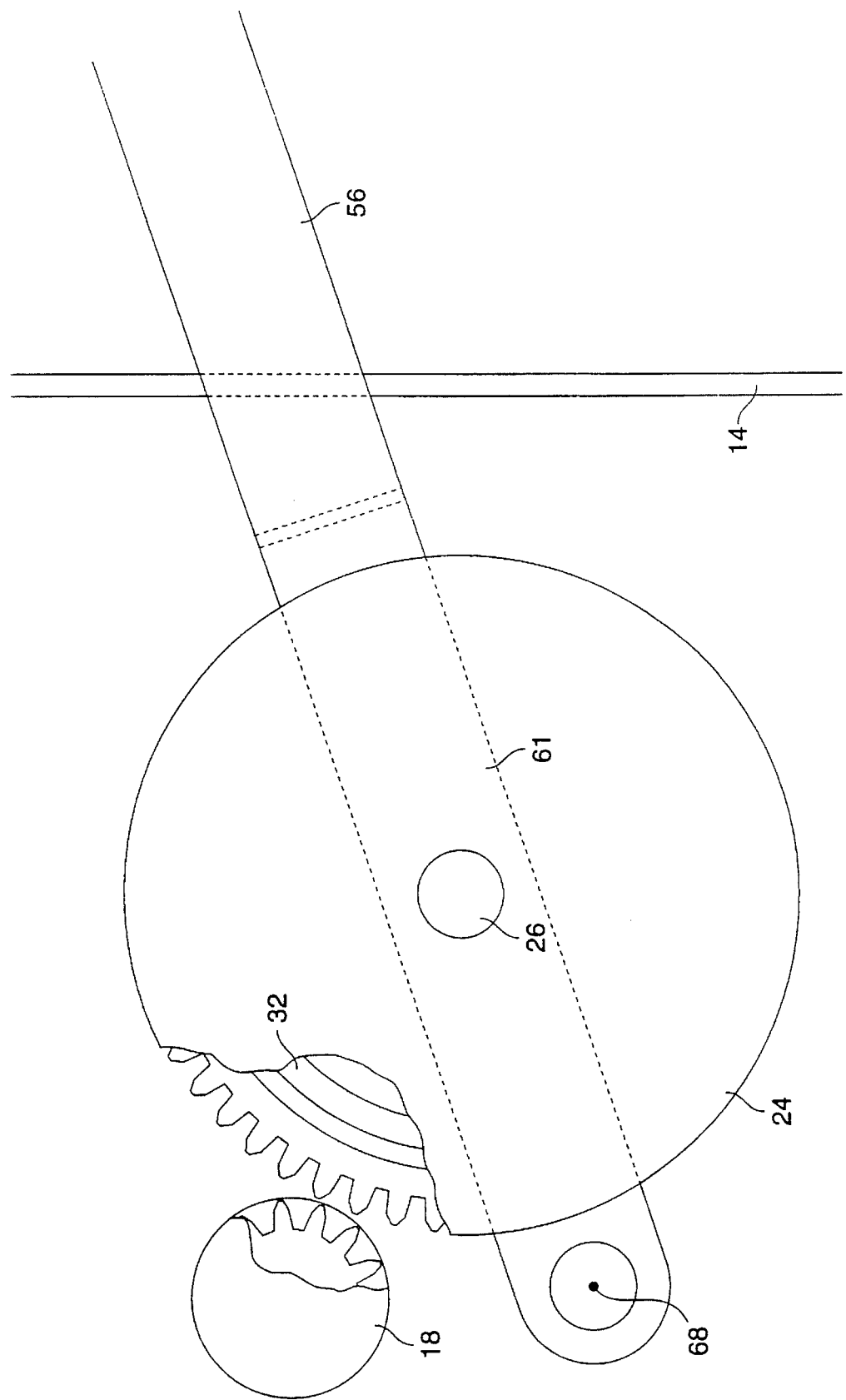
FIG. 4B is a side view of the yieldable gears in a disengaged state.

As the torsional force between third gear 28 and fourth gear 30 reaches a certain level, the third gear climbs the fourth gear rotating the yoke away from the first gear until the first and second gears become disengaged as illustrated in FIG. 4B. Once the gears become disengaged, they will stay in that position until lever 56 is manipulated to reengage the gears. Preferably, the lever may be operated by a remote controlled, battery operated solenoid to disengage the gears in the case of a power outage or device malfunction.

Figure 4C:
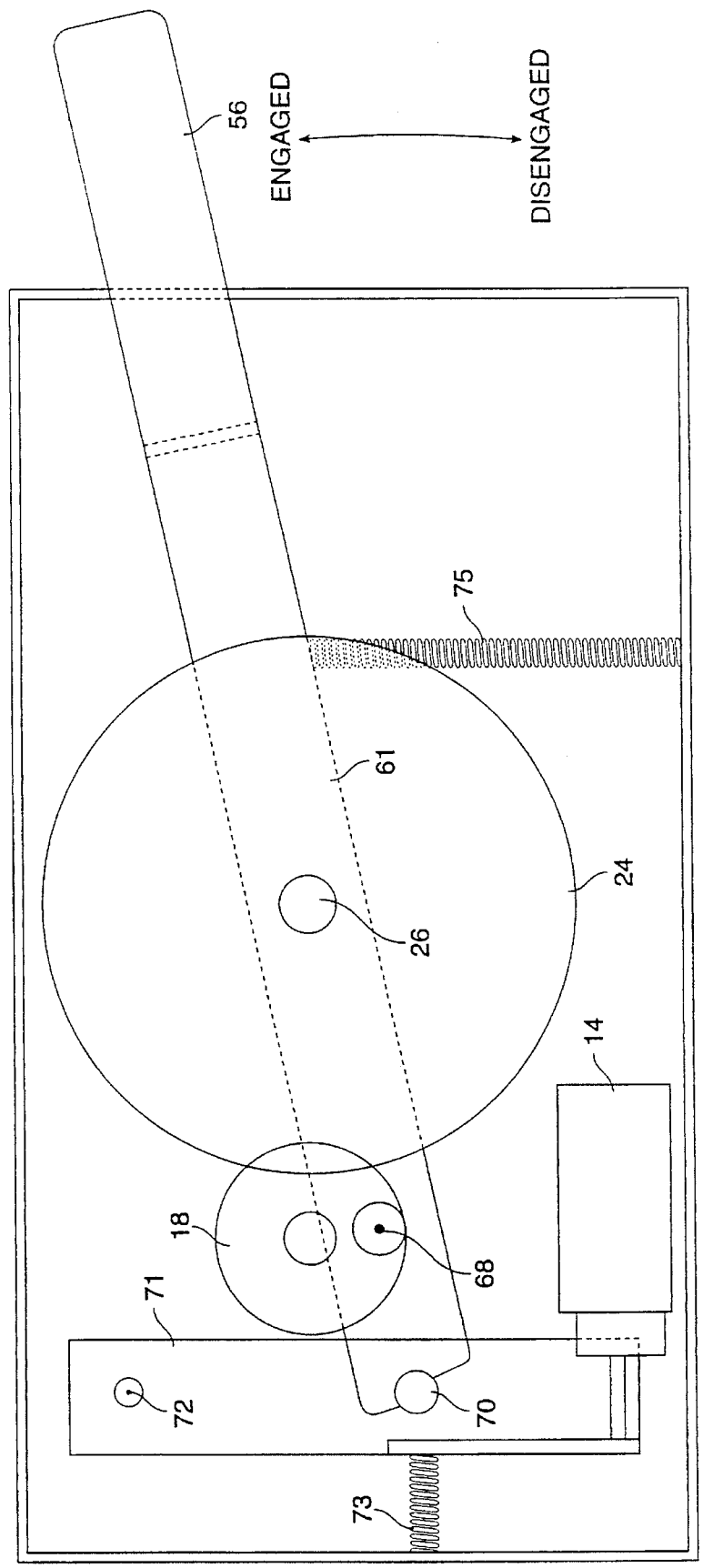
FIG. 4C is a more detailed side view.

FIG. 4C shows a more detailed side view of how the embodiment of FIG. 3 may be implemented. When the first and second gears are engaged, one end of yoke 61 seats on a circular protrusion 70. The circular protrusion is on a rotatable bar 71. The rotatable bar rotates about an axis 72 but is biased toward the yoke by a spring 73.

As before, the yoke may be manually rotated to engage and disengage the first and second gears. A solenoid 74 may also be activated to disengage the gears. When solenoid 74 is activated, bar 71 is rotated away from yoke 61 so that the end of the yoke no longer is seated on circular protrusion 70. A spring 75, which biases the yoke toward the disengaged position, then acts on the yoke to disengage the first and second gears.

Figure 5:
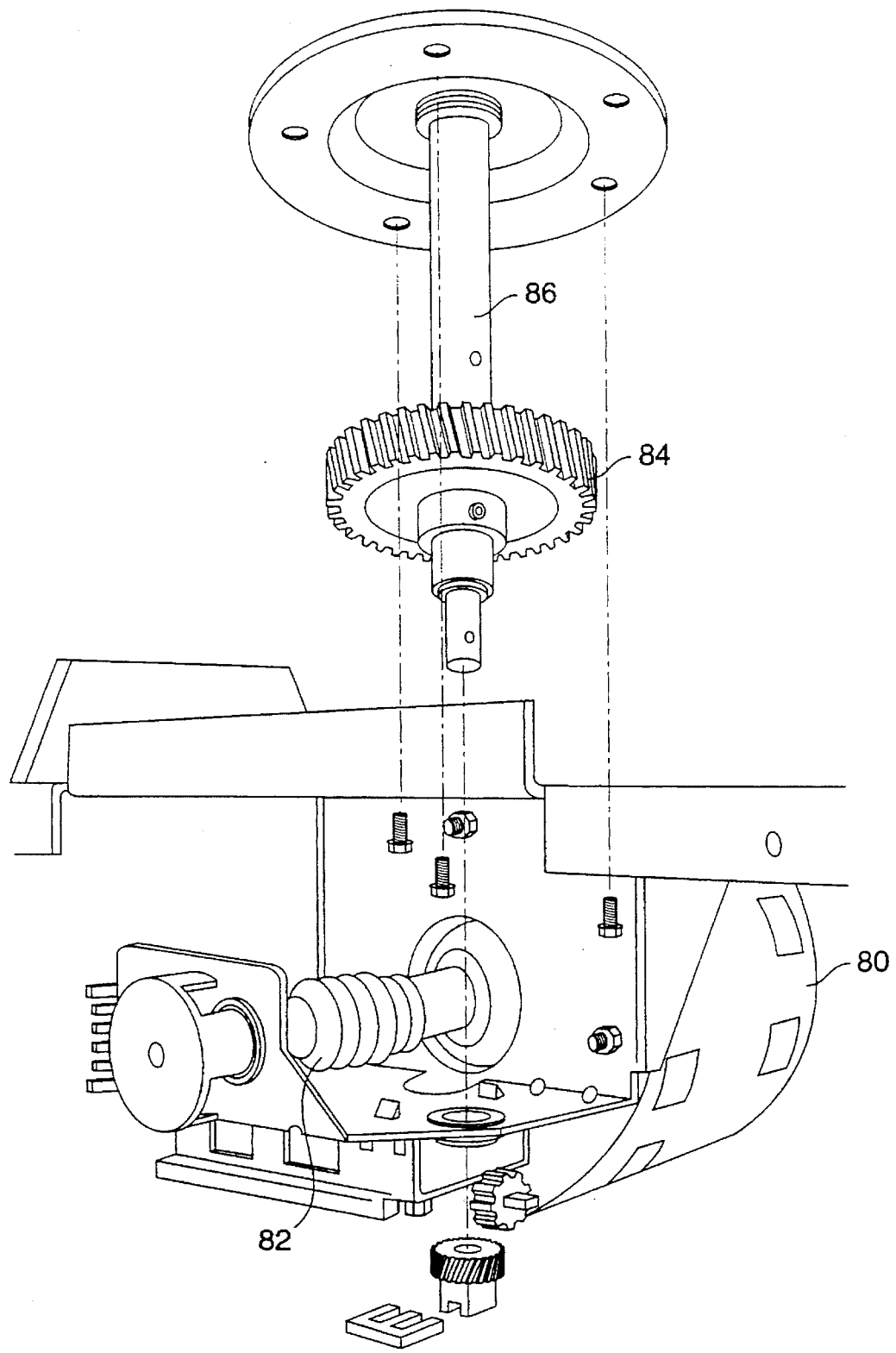
FIG. 5 is an exploded view of an actuator of the prior art.

In another embodiment of an actuator according to the present invention, an existing actuator is modified or retrofitted to incorporate yieldable gears. FIG. 5 shows a prior art actuator that may be obtained from a number of manufacturers including Chamberlain Group, Inc. of Elmhurst, Ill.

In the actuator of FIG. 5, an electric motor 80 drives a worm gear 82. The worm gear in turn drives a helical gear 84 so that speed is reduced and torque is increased. The helical gear is secured to an actuator drive shaft 86 which is connected to a mechanism for opening and closing a garage door (not shown).

Figure 6:
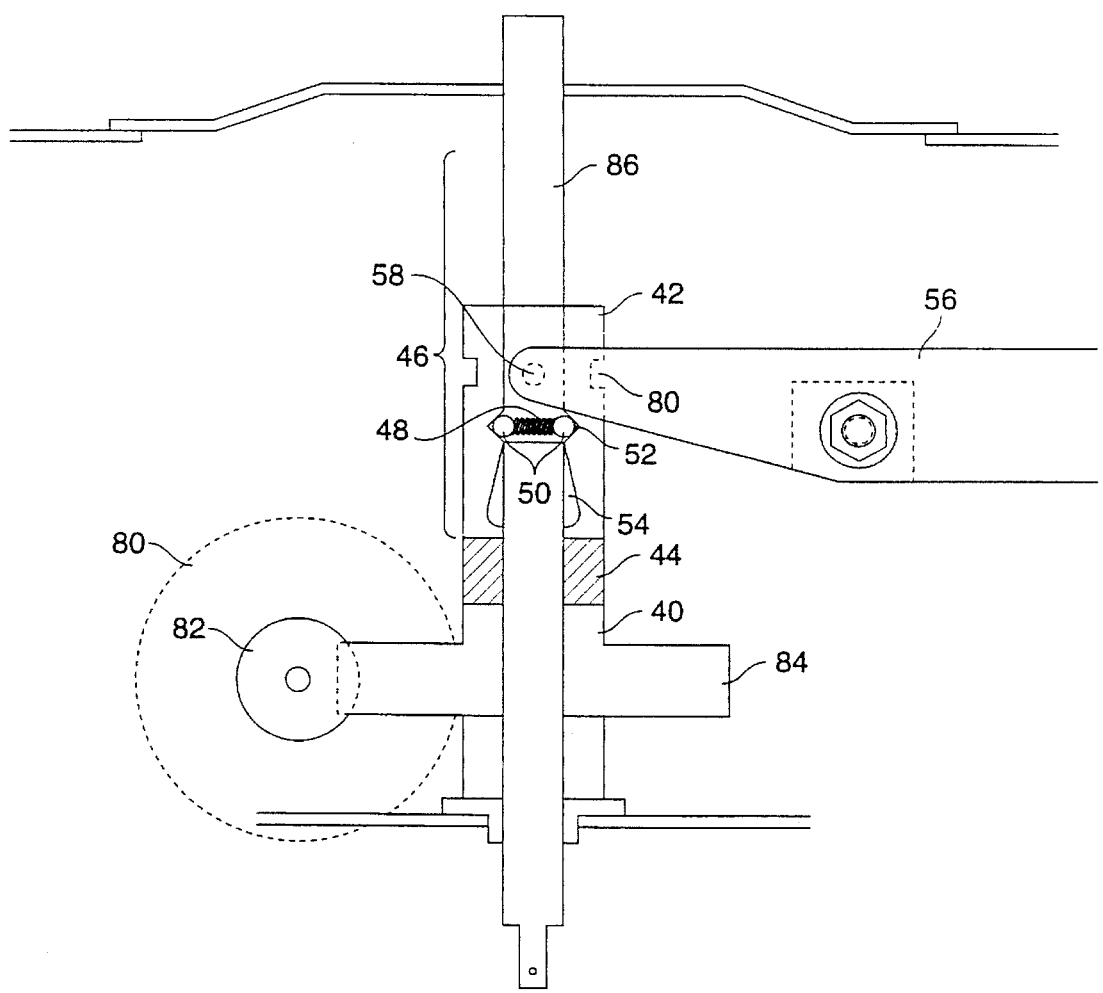
FIG. 6 is a side view of the actuator of FIG. 5 modified to incorporate the yieldable gears of the present invention.

In order to modify the transmission of FIG. 5 to incorporate the yieldable gears of the present invention, the actuator drive shaft is replaced with a shaft as shown in FIG. 6. Elements that are common with the embodiment in FIG. 2 and the actuator in FIG. 5 are shown with the same reference numerals.

FIG. 6 shows the side view of an existing actuator modified to incorporate the yieldable gears of the present invention. An electric motor 80 drives a worm gear 82. As before, the worm gear drives a helical gear 84. However, the helical gear is free to rotate about an actuator drive shaft 86. Thus, the rotation of the helical gear does not necessarily drive the actuator drive shaft as in the prior art.

The helical gear has a crown gear 40 secured to the side of the gear. Crown gear 40 is shown molded into the helical gear but it may also be a separate crown gear secured to the side of the helical gear.

Crown gear 40 engages a crown gear 42 at a crown gear teeth engagement area 44. The actuator drive shaft along area 46 has a square cross-section. Likewise, inner surface of crown gear 42 has a square cross-section. Thus, when the crown gears are engaged, crown gear 42 drives the actuator drive shaft.

When the torsional force between the crown gears reaches a certain limit, crown gear 42 moves away from crown gear 40, disengaging the crown gears so that the electric motor no longer drives the actuator shaft. Crown gear 42 is held disengaged by ball detents 50 as described earlier in reference to FIG. 2. Also, lever 56 may be rotated manually to disengage or reengage the crown gears.

Figure 7:
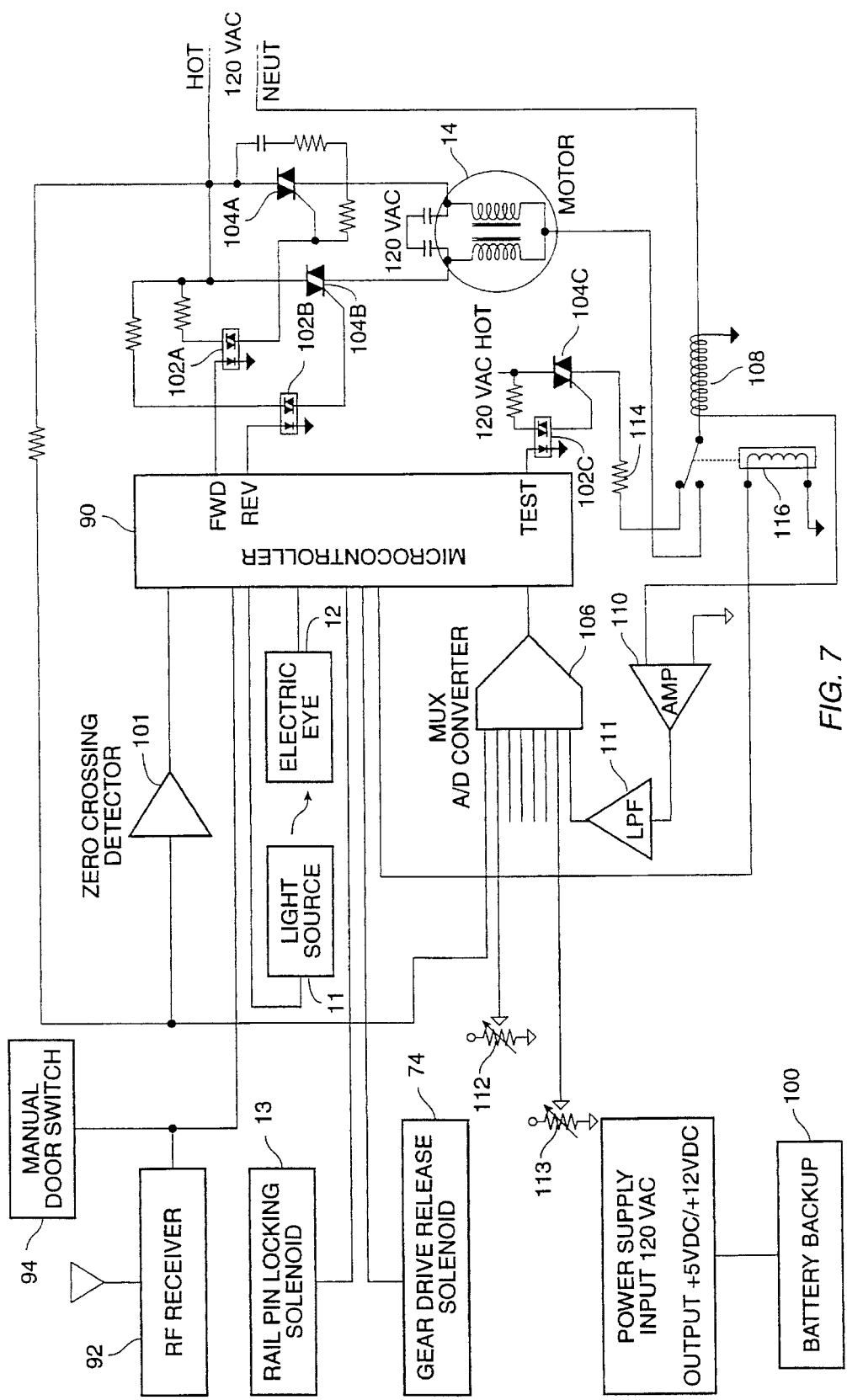
FIG. 7 is a schematic diagram of the electrical components of the present invention.

FIG. 7 shows a schematic diagram of the electrical components of the present invention. A microcontroller 90 controls the operation of the electrical components in the garage door operator according to the present invention. The microcontroller receives external commands from an RF receiver 92 or a manual door switch 94.

The microcontroller controls solenoid 13 which can be used to lock the door in a down position when the door is not in use. Solenoid 13 is configured to drive a pin into a rail of the garage door hardware so that the garage door is locked into place which increases the security of the garage door. It is especially advantageous in side mounted garage door actuators (also shown in FIG. 1) to lock the garage door in a down position to prevent it from being manually opened.

The microcontroller also controls solenoid 74 which can be used to disengage the yieldable gears in the actuator. When the microcontroller activates solenoid 74, the lever rotates to disengage the yieldable gears. This action may be activated by a remote control through RF receiver 92. Additionally, a battery backup 100 is provided so that the RF receiver, solenoids, and microcontroller may be operated without external power. The battery backup is maintained through a recharge circuit.

During a power outage or otherwise, a person can use the remote control to unlock and disengage the yieldable gears in the garage door operator so that the garage door can be opened manually. When the person presses the door opening switch on the remote control, the microcontroller checks the output of a zero crossing detector 101 connected to the AC voltage line that powers the electric motor. If the zero crossing detector output indicates that there is an absence of AC power (e.g., there is a power outage) to operate the electric motor, the microcontroller activates both solenoids 96 and 98 to allow the garage door to be opened manually. The battery backup supplies the power to these components during this time. Thus, one switch on the remote control either opens the garage door or allows it to be opened manually.

The present invention includes a method which utilizes triacs to apply power to the electric motor in order to achieve improved motor control. Microcontroller 90 controls the application of AC voltage to reversible electric motor 14 with a triac trigger and a corresponding triac. The motor is driven in a forward direction utilizing a triac trigger 102A and a triac 104A. The microcontroller controls the triac trigger which generates a trigger pulse to activate the triac. In operation, the microcontroller monitors the AC power with zero crossing detector 101. In order to create a soft start, the microcontroller delays the activation of the triac trigger for a certain amount of time after the zero crossing detector indicates the AC voltage has crossed zero. The delay causes less voltage to be applied to the electric motor through the triac. The microcontroller then gradually decreases the time delay between when the voltage crosses zero and when the triac trigger generates a pulse. In this manner, the motor receives a soft application of power which greatly reduces the objectionable initial shock and attendant noise common to garage door operators. Wear and tear on the garage door operator parts is also reduced.

Figure 8:
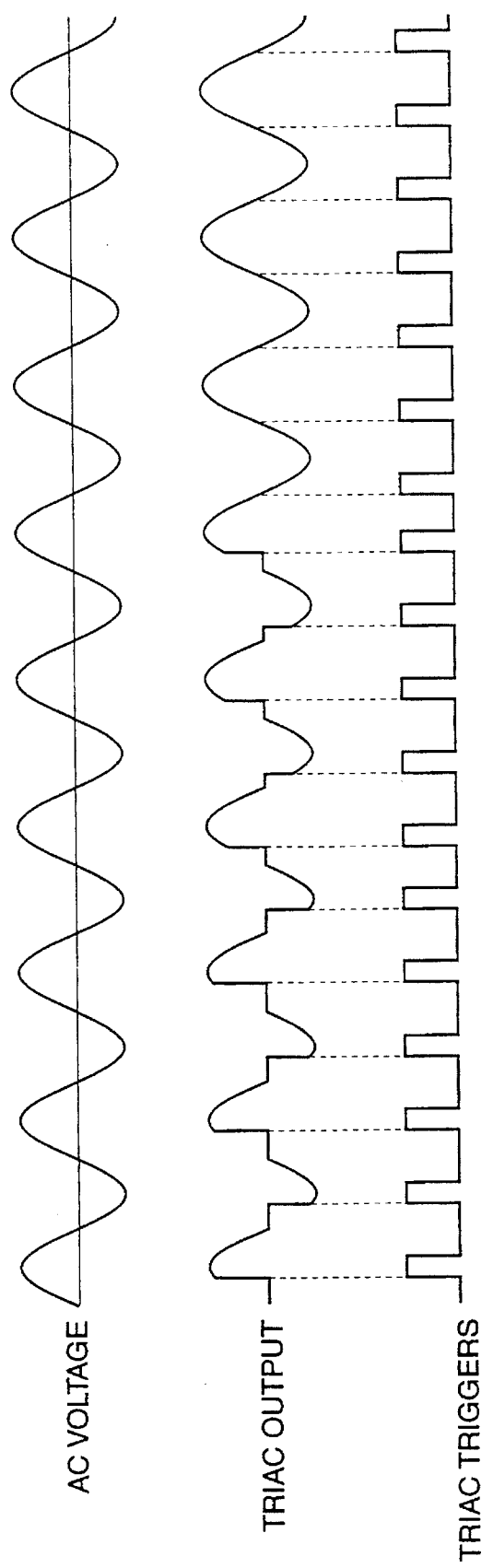
FIG. 8 is a diagram of a waveform from a triac showing an increasing application of power.

FIG. 8 shows a diagram of a waveform from a triac increasing the application of power. The triac trigger is shown pulsing the triac a time delay after the AC voltage crosses zero. Initially, the time delay is approximately equal to one quarter of the period of the AC voltage wave. This time delay is decreased until eventually the full AC wave is shown passing through the triac. This diagram shows how a triac can be used to gradually increase the application of AC power. The actual triac trigger pulse delays in a garage door operator will vary depending on factors including the type of electric motor and the garage door opening and closing mechanism utilized. During normal operation, triac 104A is preferably controlled to pass less than the full AC wave through to the motor so that the microcontroller can control the triac to compensate for fluctuations in AC power (e.g., overvoltage and brownout conditions). The microcontroller detects fluctuations in AC power by monitoring the AC voltage through an analog/digital (A/D) converter 106.

Again referring to FIG. 7, the motor is driven in a reverse direction utilizing a triac trigger 102B and a triac 104B. The present invention achieves a soft start in the same manner as described above in reference to triac trigger 102A and triac 104A for the forward direction. A soft stop is also achieved for both the forward and reverse directions by a reducing the power in a similar manner as limit switches (not shown) sense that the door is nearing the end of its travel. The limit switches may be controlled by a method disclosed in U.S. Pat. No. 5,222,327, issued Jun. 29, 1993 to Fellows et al., which has been incorporated herein by reference.

The present invention also provides an electrical method for detecting abnormal conditions that could lead to entrapment. A coil 108 senses the current through the electric motor and is connected to an amplifier 110. The coil and amplifier act as a current to voltage converter. The voltage output of the amplifier passes through a low pass filter 111. The output of the low pass filter passes through A/D converter 106 to microcontroller 90. In this manner, the microcontroller can monitor the current drawn by the electric motor during operation by the voltage from the low pass filter. The microcontroller can calculate the applied torque using revolutions per minute of the motor (measured by optical sensor 22 in FIG. 2), the horsepower of the motor (calculated by voltage applied×current drawn) and a constant (k). The constant can take into account the inefficiency of the motor at different operating temperatures so that the torque load can be more accurately measured.

When the microcontroller detects an abnormal torque load, it automatically reverses the direction of the garage door if the garage door was closing or stops the garage door if it was opening. An abnormal torque load is detected by comparing the voltage output of the low pass filter to a respective opening or closing voltage threshold. Variable resistors 112 and 113 are connected to the microcontroller via A/D converter 106. Variable resistor 112 is used to set a voltage threshold for use when the garage door is being opened. If the voltage from the low pass filter is higher than the voltage threshold from variable resistor 112, the opening voltage threshold, an abnormal torque load has been detected and the microcontroller stops applying power to the electric motor. Similarly, variable resistor 113 is used to set a voltage threshold for use when the garage door is being closed. If the voltage from the low pass filter is higher than the voltage from variable resistor 113, the closing voltage threshold, an abnormal torque load has been detected and the microcontroller reverses the application of power to the electric motor.

Typically, the voltage from the low pass filter will exceed a threshold when an obstruction is struck. However, a change in conditions may necessitate adjusting the voltage thresholds. For example, if the garage door is painted and gets heavier, the voltage thresholds may need to be adjusted to compensate for the added weight. As variable resistor 113 could be adjusted, either intentionally or unintentionally, so that the closing voltage threshold is higher than the voltage when the garage door is obstructed, it is preferable to have variable resistor 113 only adjustable within a small safe range.

Although it is known to have the actuator receive input from electric eyes to detect obstructions in order to reverse the direction of the garage door, the present invention further provides a way of increasing the security of the garage door. After electric eye 12 detects an obstruction, the microcontroller immediately reverses the movement of the garage door by reversing the motor. However, the microcontroller continues to monitor for an obstruction. If the obstruction is no longer detected during a predetermined amount of time, the microcontroller attempts to close the garage door again. Preferably, the microcontroller will only attempt to reclose the garage door a finite number of times to conserve power. Thus, if an obstruction is temporary (e.g., a cat or dog) then the garage door will later close thereby increasing the security of the door and eliminating the nuisance created when a garage door is found open after it was "closed."

The present invention also includes test circuitry to verify the operational readiness of the electrical components that electrically detect a torque overload condition. The test circuitry includes a triac trigger 102C and triac 104C which provide power as described earlier and a resistor 114. The voltage that passes through triac 104C is applied to resistor 114, which has a value selected to represent the resistance of the electric motor at an abnormal load situation. Before operation of the garage door operator, the microcontroller applies enough voltage to resistor 114 to simulate an abnormal load torque, which preferably is representative of a real obstruction. During the test, the microcontroller operates a relay 116 so that power is only applied to the test circuit. A simulated "failure" must be registered by the microcontroller within a predetermined time. If a "failure" is detected, the microcontroller activates relay 116 so that power is connected to the electric motor. However, if a "failure" does not occur within the predetermined time, the microcontroller does not activate relay 116 which prevents the electric motor from receiving power because the garage door operator would not recognize an abnormal load torque which could cause a person to be entrapped by the garage door.

While the above is a complete description of specific embodiments of the invention, various modifications, alternative constructions, and equivalents may be used. For example, the cross-sectional shape along area 46 in FIG. 2 of the distal shaft may be triangular or any number of other multi-sided shapes. Also, the yoke supporting the intermediate shaft in FIG. 3 can slide away from the first gear instead of rotating away as described. Therefore, the above description should not be taken as limiting the scope of the invention as defined by the following claims.

What is claimed is:

1. An actuator for operating a garage door, said actuator coupled to a door opening and closing mechanism, said actuator comprising:

a motor;

a transmission, coupled to said motor and said garage door opening and closing mechanism, that transmits force from said motor to said door opening and closing mechanism to close said garage door; and means, coupled to said transmission, for disengaging a portion of said transmission when the torsional force to close said garage door reaches a predetermined limit;

whereby said disengaged transmission no longer transmits force from said motor to said door opening and closing mechanism and said motor offers no resistance to manually lifting said garage door.

2. The actuator of claim 1, wherein said transmission includes first and second gears, said first and second gears being engaged to transmit force from said motor to said door opening and closing mechanism, and said disengaging means separates said first and second gears when the torsional force reaches said predetermined limit.

3. The actuator of claim 2, further comprising a means for retaining said second gear engaged with said first gear.

4. The actuator of claim 2, wherein said first and second gears are crown gears.

5. The actuator of claim 4, wherein the teeth of said first and second crown gears are at an angle of 20°–30°.

6. The actuator of claim 4, further comprising:

a shaft having a portion with an external surface having a consistent multi-sided cross-sectional shape;

said second crown gear being hollow having an internal surface, said internal surface having said cross-sectional shape;

said internal surface of second crown gear being mated to said portion of said shaft so that said second crown gear and said shaft are rotatably connected.

7. The actuator of claim 6, wherein said cross-sectional shape is square.

8. The actuator of claim 2, wherein said second gear is mounted on a yoke, said yoke being coupled to said disengaging means and rotatable to a position where said second gear disengages said first gear when the torsional force reaches said predetermined limit.

9. The actuator of claim 2, further comprising a lever, said lever being coupled to said second gear to disengage said first and second gears.

10. The actuator of claim 9, further comprising a solenoid, said solenoid being coupled to said lever such that activation of said solenoid causes said first and second gears to disengage.

11. The actuator of claim 10, further comprising a battery for supplying power to said solenoid.

12. The actuator of claim 11, further comprising a controller coupled to said solenoid and said battery, said controller activating said solenoid in response to a command to open said garage door when there is insufficient power for said motor to open said garage door.

13. The actuator of claim 1, further comprising a circuit that provides power to said motor, said circuit comprising:

an alternating current source;

a detector, coupled to said alternating current source, for detecting when said alternating current crosses zero;

a triac switch, coupled between said alternating current source and said motor, for selectively connecting said alternating current source to said motor;

a triac control circuit, coupled to said triac switch, for switching said triac switch to connect said alternating current source to said motor; and a means, coupled to said detector and said triac control circuit, for directing the operation of said triac control circuit after said alternating current crosses zero in order to vary the power applied to said motor.

14. The actuator of claim 1, further comprising a circuit for testing the ability of the actuator to electrically detect an overload torque condition, said circuit comprising:

an impedance approximating the resistance of said motor at an abnormal load;

a means, coupled to said impedance, for determining the current drawn by said impedance;

a means, coupled to said impedance, for applying a voltage to said impedance that would generate an overload torque condition in said motor; and a control circuit, coupled to said determining means and said applying means, for controlling the application of voltage to said impedance, receiving the value of the current drawn from said determining means, and preventing said actuator from operating if an overload torque condition fails to be detected with a predetermined time period.

15. The actuator of claim 1, wherein said door opening and closing mechanism comprises:

a rail, said rail having at least one hole and said garage door moving between an up and down position along said rail;

a pin, said pin being reciprocatingly placed in said at least one hole to prevent said garage door from moving along said rail; and a solenoid, said solenoid operably coupled to said pin to reciprocatingly move said pin.

16. The actuator of claim 15, further comprising a battery for supplying power to said solenoid.

17. The actuator of claim 16, further comprising a controller coupled to said solenoid and said battery, said controller activating said solenoid in response to a command to open said garage door when there is insufficient power for said motor to open said garage door.

18. The actuator of claim 1, wherein:

during garage door closure, said actuator reverses the movement of said garage door if an obstruction is detected; and said actuator closes said garage door when said obstruction is no longer detected.

19. An actuator for operating a garage door, comprising:

a motor;

a drive shaft;

a first crown gear coupled to said motor;

a second crown gear coupled to said drive shaft, said second crown gear being movable from a first position engaged with said first crown gear and a second position disengaged with said first crown gear; and a detent, coupled to said second crown gear, that retains said second crown gear in said first position and allowing said second crown gear to move to said second position when the torsional force between said first and second crown gears reaches a predetermined limit.

20. The actuator of claim 19, wherein the teeth of said first and second crown gears are at an angle of 20°–30°.

21. The actuator of claim 19, wherein: said drive shaft has a portion with an external surface having a consistent multi-sided cross-sectional shape;

said second crown gear being hollow having an internal surface, said internal surface having said cross-sectional shape;

said internal surface of second crown gear being mated to said portion of said shaft so that said second crown gear and said driving shaft are rotatably connected.

22. The actuator of claim 21, wherein said cross-sectional shape is square.

23. The actuator of claim 19, further comprising a lever coupled to said second crown gear such that movement of said lever moves said second crown gear between said first position and said second position.

24. The actuator of claim 23, further comprising a solenoid, said solenoid being coupled to said lever such that activation of said solenoid causes said second crown gear to move from said first position to said second position.

25. An actuator for operating a garage door, comprising:

a motor;

a first gear coupled to said motor;

an intermediate shaft having a second and third gear;

a yoke supporting said intermediate shaft, said yoke being able to rotate said intermediate shaft from a first position where said first gear engaged with said second gear to a second position where said first gear is disengaged from said second gear;

a drive shaft having a fourth gear, said fourth gear engaging said third gear; and a detent, coupled to said intermediate shaft, that retains said intermediate shaft in said first position and allowing said intermediate shaft to move to said second position when the torsional force between said third and fourth gears reaches a predetermined limit.

26. The actuator of claim 25, wherein the axis of rotation of said yoke is the same as the axis of rotation of said fourth gear and different than the axis of rotation of said first gear.

27. The actuator of claim 25, further comprising a lever coupled to said intermediate shaft such that movement of said lever moves said intermediate shaft between said first position and said second position.

28. The actuator of claim 27, further comprising a solenoid, said solenoid being coupled to said lever such that activation of said solenoid causes said intermediate shaft to move from said first position to said second position.

29. In an actuator for operating a garage door having a motor, a worm gear coupled to said motor, a helical gear coupled to said worm gear, and a drive shaft coupled to said helical gear, the improvement comprising:

a first crown gear coupled to said helical gear; and a second crown gear coupled to said drive shaft, said second crown gear movable from a first position engaged with said first crown gear to a second position disengaged with said first crown gear when the torsional force between said first and second crown gears reaches a predetermined limit;

whereby said motor no longer transmits force to said drive shaft when said first and second crown gears are disengaged.

30. A garage door operator, comprising:

a garage door;

a rail, said garage door moving between an up and down position along said rail;

a pin, said pin being reciprocatingly placed in said rail to prevent said garage door from moving along said rail;

a solenoid, said solenoid operably coupled to said pin to reciprocatingly move said pin; and a means for remotely controlling said solenoid.

31. The garage door operator of claim 30, further comprising a battery for supplying power to said solenoid.

32. A garage door actuator for opening and closing a garage door, comprising:

a motor; and a transmission, coupled to said motor, that transmits force to open and close said garage door, said transmission disengaging when the force to close said garage door reaches a predetermined limit so that said motor offers no resistance to manually lifting said garage door.

33. The actuator of claim 32, wherein said transmission includes a pair of yieldable gears.

34. The actuator of claim 33, wherein said pair of yieldable gears are crown gears mounted on a shaft.

35. The actuator of claim 33, wherein one of said pair of yieldable gears is mounted on a yoke that is rotatable to a position where said pair of yieldable gears are disengaged.

36. A garage door actuator for opening and closing a garage door, comprising:

a rail, said garage door moving between an up and down position along said rail;

a pin, said pin being reciprocatingly placed in said rail to prevent said garage door from moving along said rail;

a solenoid, said solenoid operably coupled to said pin to reciprocatingly move said pin; and a means for remotely controlling said solenoid.

* * * * *